US012643743B2

(12) United States Patent
Watters et al.

(10) Patent No.: US 12,643,743 B2
(45) Date of Patent: Jun. 2, 2026

(54) SHAFT SUPPORT FOR INDUSTRIAL MACHINE

(71) Applicant: Joy Global Underground Mining LLC, Warrendale, PA (US)

(72) Inventors: Logan S. Watters, Lexington, KY (US); Charles W. Watson, Paris, KY (US)

(73) Assignee: Joy Global Underground Mining LLC, Warrendale, PA (US)

( * ) Notice: Subject to any disclaimer, the term of this patent is extended or adjusted under 35 U.S.C. 154(b) by 239 days.

(21) Appl. No.: 18/345,813

(22) Filed: Jun. 30, 2023

(65) Prior Publication Data

US 2024/0240672 A1    Jul. 18, 2024

Related U.S. Application Data

(60) Provisional application No. 63/439,493, filed on Jan. 17, 2023.

(51) Int. Cl.
| | |
|---|---|
| *B65G 23/44* | (2006.01) |
| *B65G 23/06* | (2006.01) |
| *B65G 33/32* | (2006.01) |
| *F16C 19/38* | (2006.01) |
| *F16C 35/077* | (2006.01) |

(52) U.S. Cl.
CPC ............. *B65G 23/44* (2013.01); *B65G 23/06* (2013.01); *B65G 33/32* (2013.01); *F16C 35/077* (2013.01); *F16C 19/38* (2013.01)

(58) Field of Classification Search
CPC ........ F16C 35/077; F16C 19/38; B65G 23/44; B65G 23/06; B65G 33/32
USPC .......................................................... 198/672
See application file for complete search history.

(56) References Cited

U.S. PATENT DOCUMENTS

| | | | | |
|---|---|---|---|---|
| 5,027,940 | A * | 7/1991 | Woodward ............. | B65G 45/04 |
| | | | | 198/821 |
| 7,111,724 | B2 * | 9/2006 | Donnenhoffer ........ | B65G 23/44 |
| | | | | 198/810.03 |
| 7,614,493 | B2 * | 11/2009 | Dowling ................ | B65G 39/16 |
| | | | | 198/837 |
| 10,442,628 | B1 * | 10/2019 | Chang .................... | B65G 39/09 |
| 2006/0147144 | A1 * | 7/2006 | Holman ................ | F16C 23/082 |
| | | | | 384/536 |
| 2019/0106280 | A1 * | 4/2019 | Gettig .................... | B65G 23/06 |

FOREIGN PATENT DOCUMENTS

| | | | | | |
|---|---|---|---|---|---|
| DE | 10343541 | A1 * | 5/2005 | ............. | B65G 23/44 |
| EP | 3636564 | A1 * | 4/2020 | ............. | B65G 23/44 |
| WO | WO-2006072012 | A2 * | 7/2006 | ............. | F16C 23/08 |

* cited by examiner

*Primary Examiner* — James R Bidwell
(74) *Attorney, Agent, or Firm* — Husch Blackwell LLP

(57)    ABSTRACT

A bearing assembly is provided for supporting a shaft for rotation. The bearing assembly includes a housing, a bearing positioned in the housing and coupled to the shaft, and a mount coupled to the bearing and to the housing. The bearing is configured to support the shaft about an axis. The mount is movable relative to the housing, thereby allowing movement of the bearing relative to the housing.

20 Claims, 9 Drawing Sheets

SHAFT SUPPORT FOR INDUSTRIAL MACHINE

CROSS REFERENCE TO RELATED APPLICATION

The present application claims priority to U.S. Provisional Patent Application No. 63/439,493, filed Jan. 17, 2023, the entire contents of which is hereby incorporated by reference.

FIELD

The present disclosure relates to an industrial machine, such as a conveyor, and more particularly to a tail shaft assembly of a conveyor.

SUMMARY

In one independent aspect, a bearing assembly is provided for supporting a shaft for rotation. The bearing assembly includes a housing, a bearing positioned in the housing and coupled to the shaft, and a mount coupled to the bearing and to the housing. The bearing is configured to support the shaft about an axis. The mount is movable relative to the housing, thereby allowing movement of the bearing relative to the housing.

In another independent aspect, a mount is configured to support a bearing within a housing. The mount includes a first member, a support, and a second member. The first member includes a mounting portion configured to be coupled to the bearing and a protruding portion extending from the mounting portion. The support is configured to be secured relative to the housing. The support has an aperture extending therethrough, and the protruding portion extends at least partially through the aperture. The second member is coupled to an end of the protruding portion, and the second member positioned on an opposite side of the support from the mounting portion.

In yet another independent aspect, an idler assembly for a mining machine includes an idler shaft, a first bearing assembly and a second bearing assembly. The idler shaft includes a first end, a second end, and a shaft axis extending therebetween. The first bearing assembly supports the first end of the idler shaft for rotation about the shaft axis, and the first bearing assembly is configured to support the idler shaft relative to a frame. The second bearing assembly supports the second end of the idler shaft for rotation about the shaft axis, and the second bearing assembly is configured to support the idler shaft relative to the frame. At least one of the first bearing assembly and the second bearing assembly includes a housing, a bearing supported by the housing, and a mount configured to allow relative translational movement between the idler shaft and the housing.

Other aspects of the disclosure will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of supporting other embodiments and being practiced or being carried out in various ways. Also, it is to be understood that the phraseology and terminology used herein is for the purpose of description and should not be regarded as limiting. Unless specified or limited otherwise, the terms "mounted," "connected," "supported," and "coupled" and variations thereof are used broadly and encompass both direct and indirect mountings, connections, supports, and couplings. Terms of degree, such as "substantially," "about," "approximately," etc. are understood by those of ordinary skill to refer to reasonable ranges outside of the given value, for example, general tolerances associated with manufacturing, assembly, and use of the described embodiments.

Figure 1:
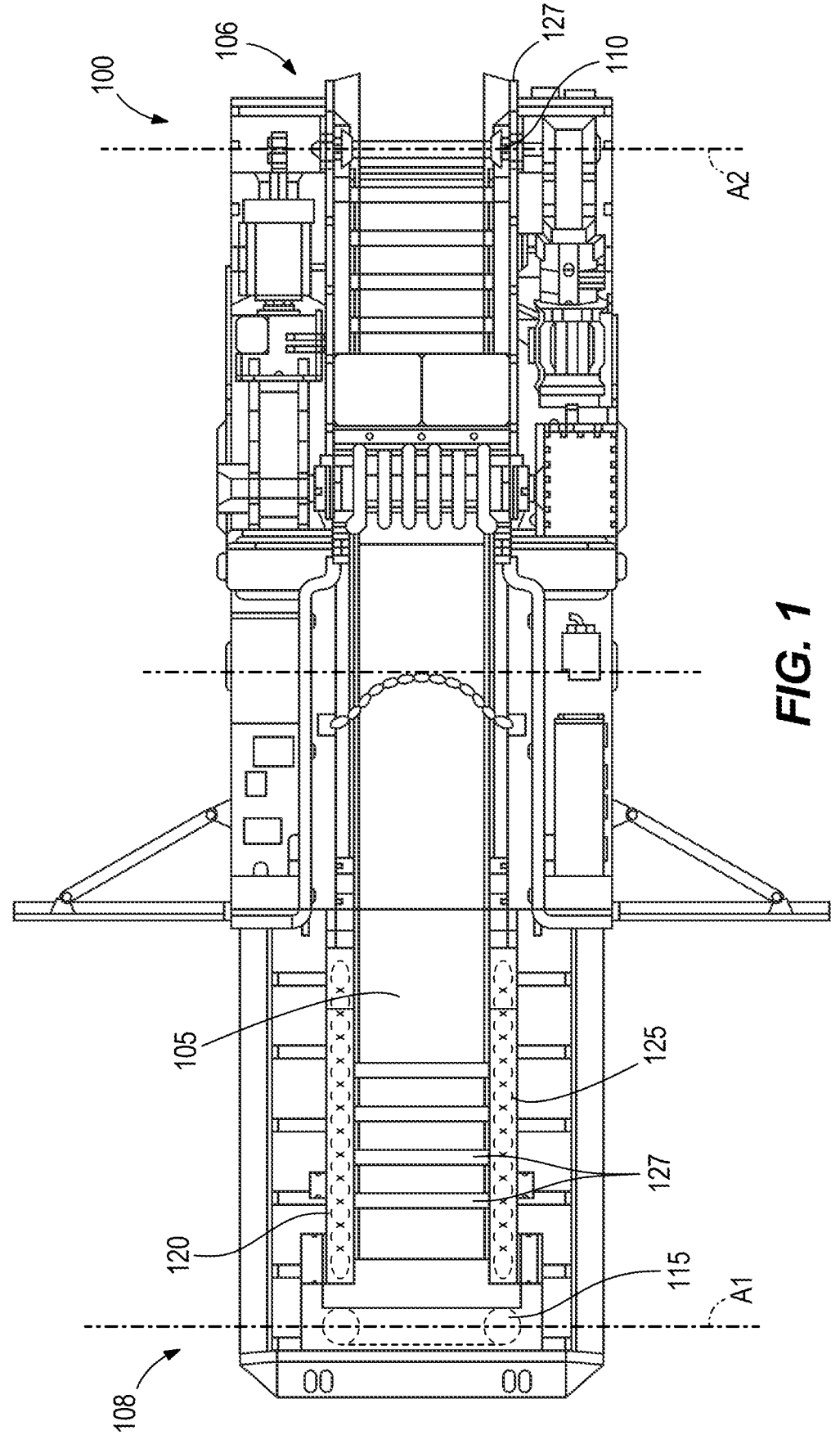
FIG. 1 is a plan view of an industrial machine.

FIG. 1 illustrates an industrial machine 100, such as a continuous mining machine. The machine 100 includes a conveyor 105, a head shaft 110, and a tail shaft 115. The head shaft 110 and the tail shaft 115 are supported by a frame 127 and are positioned on opposite ends of the conveyor 105. In some embodiments, the head shaft 110 may be positioned adjacent a downstream end 106 of the conveyor 105, and the tail shaft 115 may be positioned adjacent an upstream end 108 of the conveyor 105. Therefore, in some embodiments, the tail shaft 115 is positioned closer to an intake end of the conveyor system 100 than the head shaft 110.

The head shaft 110 functions as a drive shaft and is operably coupled to a drive system (not shown) which drives rotation of the head shaft 110 to induce movement of the conveyor 105. The tail shaft 115 is operably coupled to the head shaft 110 and functions as an idler. A first chain 120 extends around an end of the head shaft 110 and an end of the tail shaft 115, and a second chain 125 extends around another end of the head shaft 110 and another end of the tail shaft 115. In some embodiments, the first and second chains 120, 125 couple the tail shaft 115 and the head shaft 110 for co-rotation, and the tail shaft 115 acts as an idler for the driven head shaft 110. Alignment of the head shaft 110 and the tail shaft 115 may prevent premature wear of components of the conveyor system 100. Accordingly, the tail shaft 115 is capable of limited angular misalignment, relative to the frame 127, to allow the tail shaft 115 to align with the head shaft 110 even if the downstream and upstream ends 106, 108 of the conveyor 105 are misaligned. The tail shaft 115 rotates about a tail shaft rotational axis A1, and the head shaft 110 rotates about a head shaft rotational axis A2. For the purposes of this disclosure, the tail shaft 115 and the head shaft 110 can be considered "aligned" when the tail shaft rotational axis A1 is parallel to and coplanar with the head shaft rotational axis A2.

Figure 2:
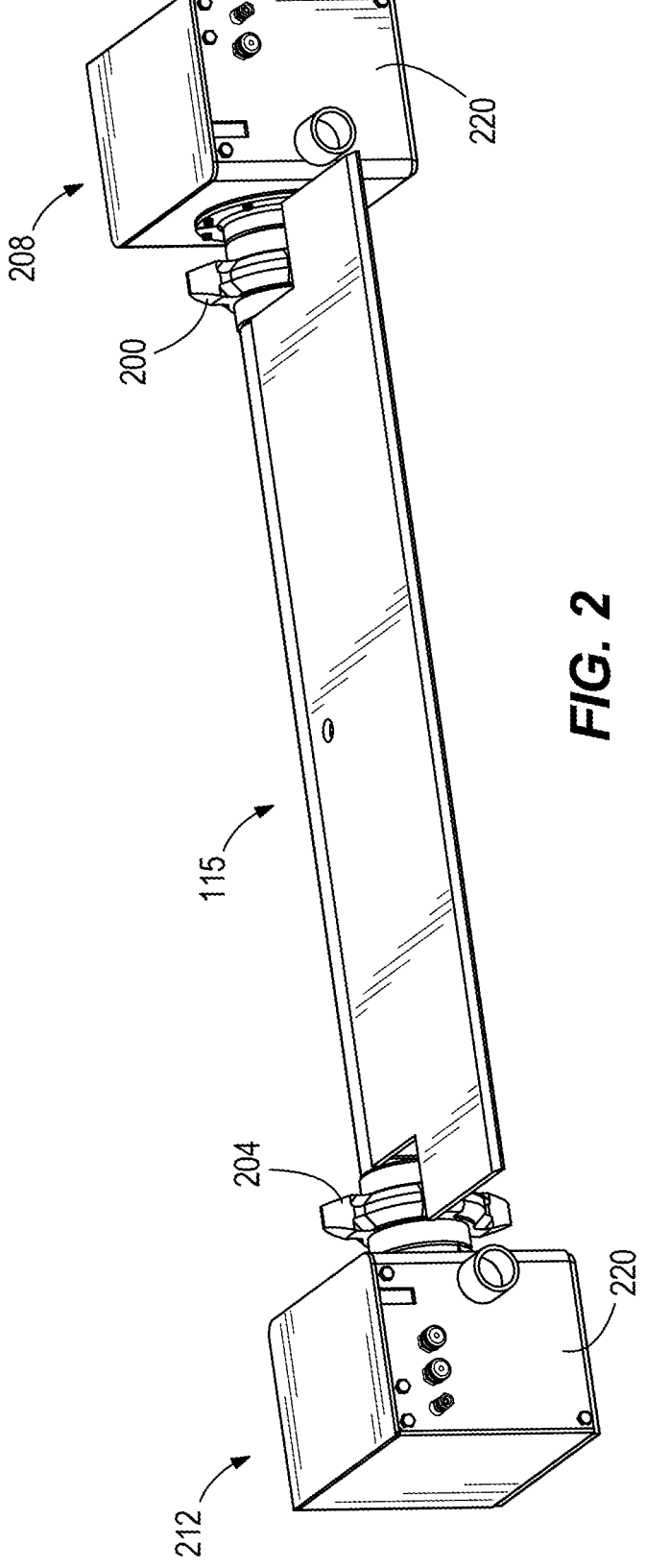
FIG. 2 is a perspective view of a tail shaft assembly.
Figure 3:
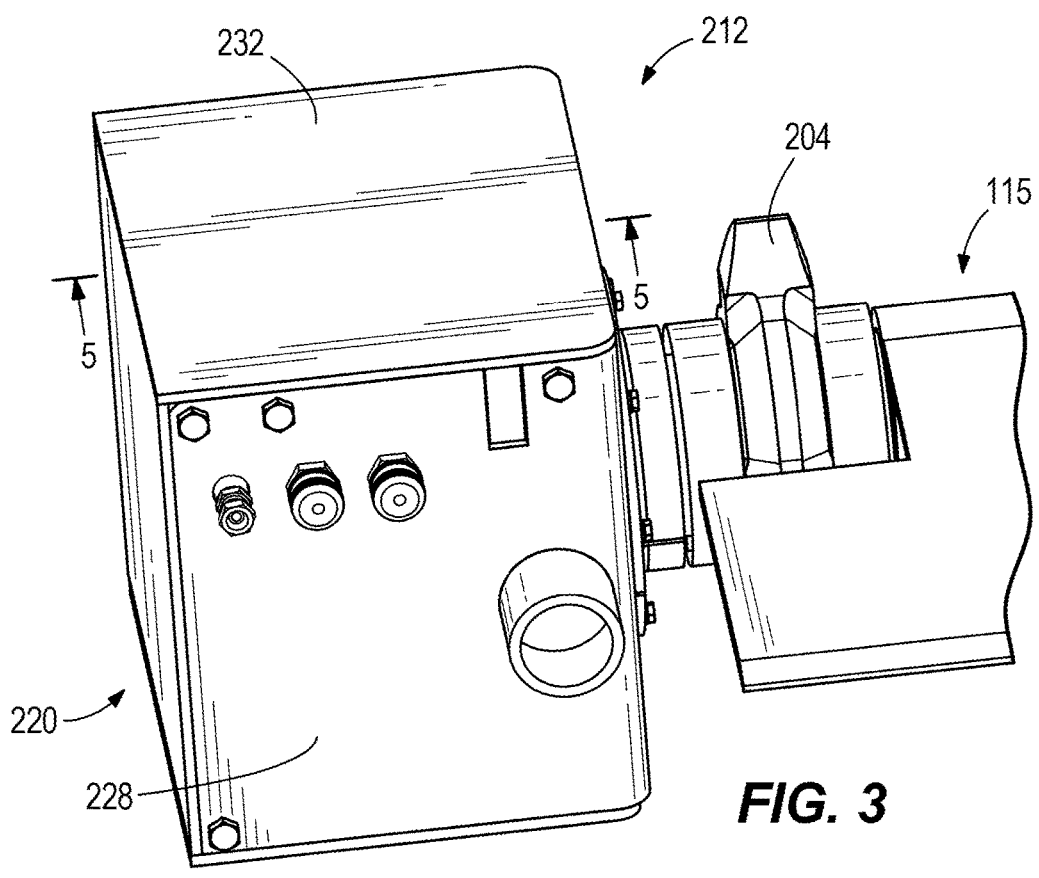
FIG. 3 is an enlarged perspective view of a portion of the tail shaft assembly of FIG. 2.

With reference to FIGS. 2 and 3, the tail shaft 115 includes a first sprocket 200 positioned on the tail shaft 115, and a second sprocket 204 positioned on the tail shaft 115 and spaced apart from the first sprocket 200 by a distance along a length of the tail shaft 115. The first sprocket 200 engages the first chain 120 (FIG. 1), and the second sprocket 204 engages the second chain 125. Both the first sprocket 200 and the second sprocket 204 are secured to the tail shaft 115 in an axially and rotationally fixed manner. For example, the first and second sprockets 200, 204 may be press-fit onto the tail shaft 115 or utilize a keyed connection between the sprockets 200, 204 and the tail shaft 115. Therefore, the tail shaft 115 may be coupled for co-rotation with both of the first and second sprockets 200, 204. In some embodiments, the sprockets 200, 204 may be rotationally secured to the tail shaft 115 and capable of limited axial movement along the tail shaft 115 (e.g., along the tail shaft rotational axis A1—FIG. 1).

As shown in FIG. 2, the tail shaft 115 is supported for rotation by a first shaft support or first bearing assembly 208, and a second shaft support or second bearing assembly 212. In the illustrated embodiment, the bearing assemblies 208, 212 are positioned adjacent opposite ends of the tail shaft 115, and the first sprocket 200 and second sprocket 204 are positioned between the bearing assemblies 208, 212. The bearing assemblies 208, 212 may be coupled to the frame 127. The bearing assemblies 208, 212 permit some angular misalignment of the tail shaft 115 between one another to accommodate for misalignment of downstream and upstream ends 106, 108 of the conveyor 105. In the illustrated embodiment, each of the bearing assemblies 208, 212 includes similar components. For simplicity, the second bearing assembly 212 is described in detail herein. It should be understood that the description of the components of the second bearing assembly 212 may be similarly applicable to the components of the first bearing assembly 208.

With reference to FIGS. 3-6, the second bearing assembly 212 includes a bearing 216 (FIGS. 4-6), an assembly housing or outer box 220, and a mount 224 (FIGS. 4 and 5) coupled between the bearing 216 and the outer box 220. The mount 224 supports the bearing 216 within the outer box 220 and allows for movement of the bearing 216 relative to the outer box 220 (thereby allowing misalignment between the bearing 216 and the outer box 220).

Figure 6:
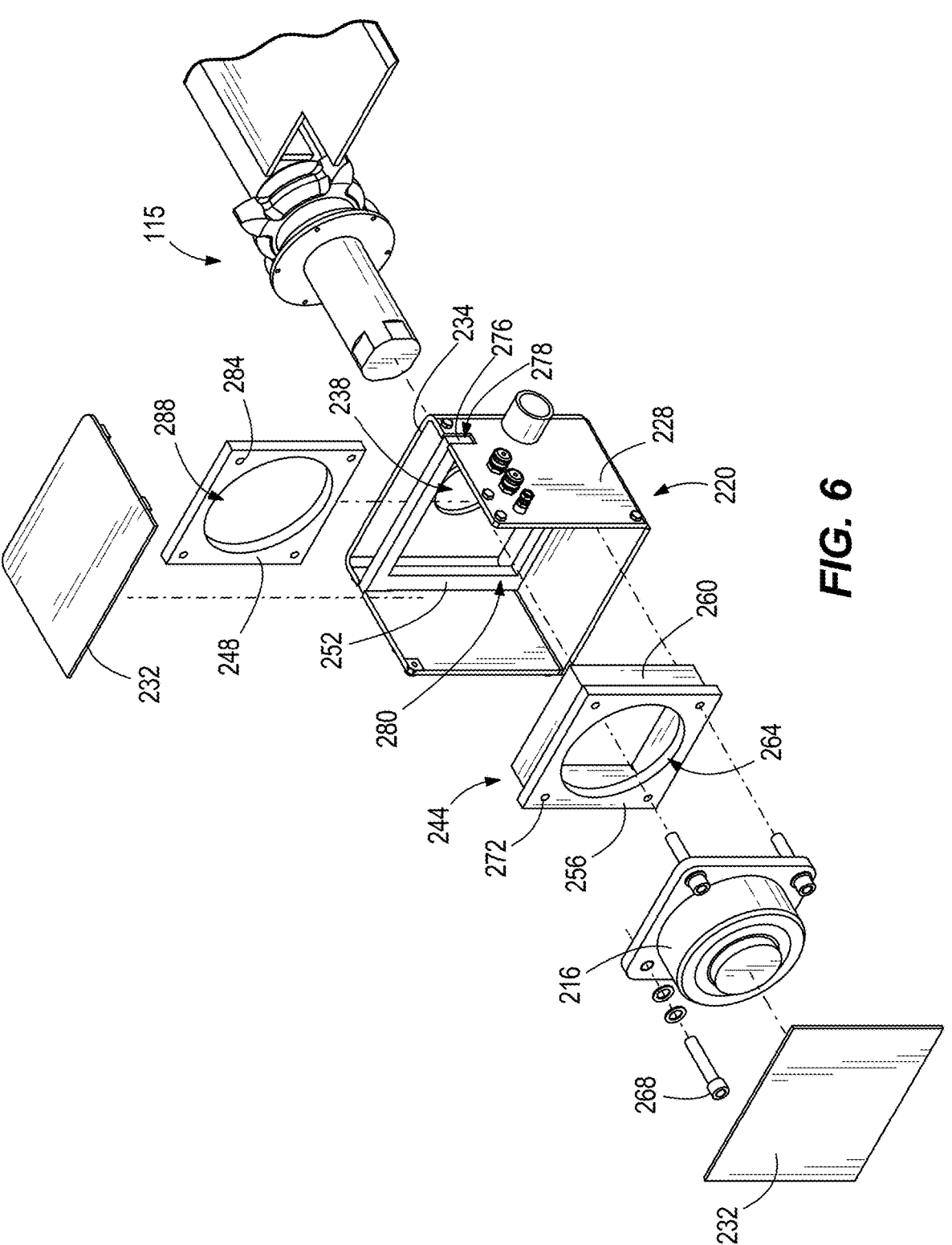
FIG. 6 is an exploded perspective view of the portion of the tail shaft assembly of FIG. 3.

In some embodiments, the outer box 220 is secured to the frame 127 of the mining machine 100. As shown in FIG. 6, in the illustrated embodiment, the outer box 220 includes a base 228 and one or more covers 232, which may together define a generally cuboid outer profile. The base 228 may include four sides of the outer box 220, including a laterally inner side wall 234 having an aperture 238 though which a portion of the tail shaft 115 extends. In some embodiments, the cover(s) 232 may be selectively couplable to the base 228. The cover 232 may be secured to the base 228 via a plurality of fasteners, or may be welded to the base 228. In some embodiments, the cover 232 is separable from the base 228 to allow for access to the bearing 216 and the mount 224 for maintenance or replacement. It should be understood that the outer box 220 is not limited to a generally cuboid outer profile, nor is the outer box 220 limited to including a cover 232 and a base 228. In other embodiments, the outer box 220 may be of another shape and/or may be constructed in a different manner.

Figure 4:
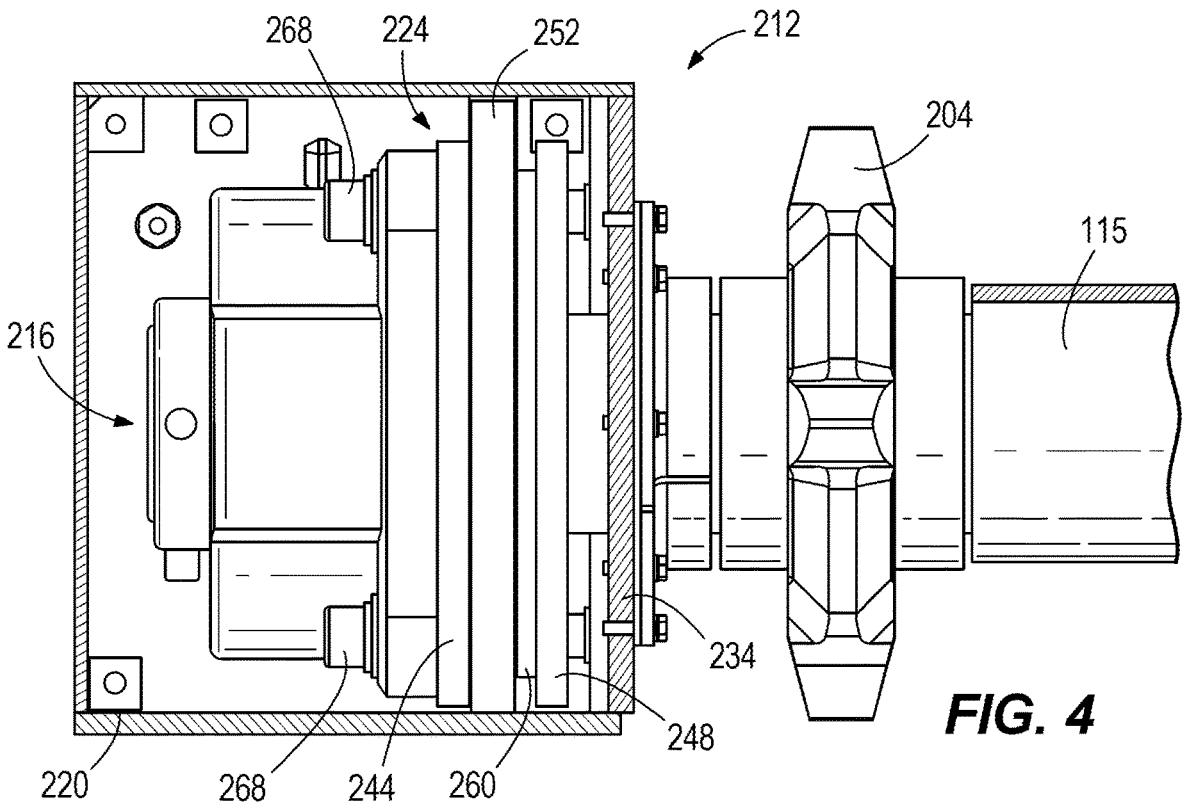
FIG. 4 is side view of a portion of the tail shaft assembly of FIG. 2, with a portion of a bearing housing removed.
Figure 5:
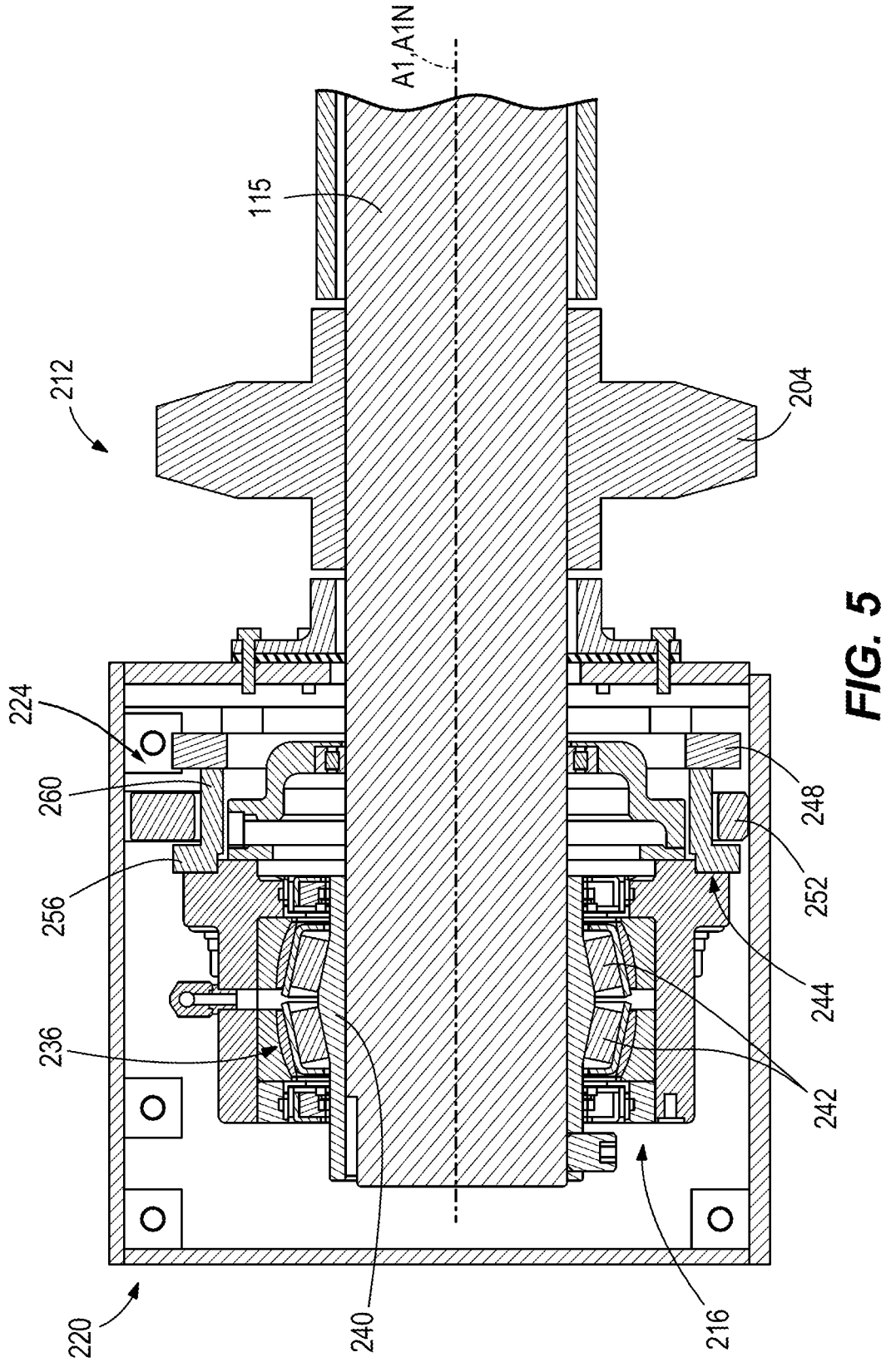
FIG. 5 is a cross-sectional view of the portion of the tail shaft assembly of FIG. 3, viewed along section 5-5.

Referring to FIGS. 4-6, the bearing 216 is disposed within the outer box 220, and is coupled to the tail shaft 115 to support the tail shaft 115 for rotation. As best shown in FIG. 5, in the illustrated embodiment the bearing 216 includes an outer race assembly 236, an inner race 240 coupled to the tail shaft 115, and a plurality of rolling elements 242 adapted to support the inner race 240 for rotation relative to the outer race assembly 236. In some embodiments, the plurality of rolling elements 242 may be a plurality of cylindrical roller elements or tapered roller elements. In some embodiments, the bearing member 242 may include one or more spherical rolling elements. The inner race 240 is secured to the tail shaft 115 and rotates with the tail shaft, while the outer race 236 is coupled to the outer box 220 via the mount 224.

The mount 224 supports the bearing 216 within the outer box 220. The mount 224 includes a front member 244, a backing member or retainer 248, and a support 252. The front member 244 is selectively coupled to the bearing 216 to secure the mount 224 to the bearing 216. The front member 244 includes a mounting portion 256 and a protruding portion 260. In some embodiments, the mounting portion 256 may include a planar flange having a rectangular perimeter when viewed along the tail shaft rotational axis A1. In the illustrated embodiment, the mounting portion 256 has a shape that generally corresponds to the bearing 216. The protruding portion 260 extends or protrudes in a direction parallel to the axis A1, and may also have a rectangular perimeter when viewed along the tail shaft rotational axis A1. In the illustrated embodiment, the mounting portion 256 has a larger perimeter than that of the protruding portion 260. In other embodiments, the mounting portion 256 and the protruding portion 260 may have different perimeter shapes. For example, the mounting portion 256 may be circular or non-circular, and the protruding portion 260 may be any non-circular shape.

In the illustrated embodiment, the mounting portion 256 abuts the bearing 216 when the front member 244 is secured to the bearing 216, and the protruding portion 260 extends away from the planar mounting flange portion 256 in a direction opposite the bearing 216. The front member 244 also includes a centrally located aperture 264 through which the tail shaft 115 extends. In the illustrated embodiment, the bearing 216 is secured to the front member 244 (e.g., by a plurality of fasteners 268 extending through bores 272 (FIG. 6) spaced apart about a perimeter of the front member 244). The fastener receiving bores 272 may extend through both the mounting portion 256 and the protruding portion 260.

As shown in FIGS. 4-6, the support 252 may be a plate-like structure that is fixed to the outer box 220 to secure the mount 224 within the outer box 220. In the illustrated embodiment, the support 252 has a rectangular perimeter when viewed along the tail shaft rotational axis A1, and the support 252 includes tabs 276 (FIG. 6) positioned along the perimeter of the support 252 and configured to extend into slots 278 (FIG. 6) in the outer box 220. In some embodiments, the support 252 may be welded to the outer box 220. In some embodiments, the support 252 may be coupled to the outer box 220 in a different manner. The support 252 includes an aperture 280 through which the protruding portion 260 of the front member 244 extends. The shape of the aperture 280 may correspond to the shape of the protruding portion 260, but may be larger in size than the protruding portion 260.

The backing member 248 is selectively coupled to the axially protruding portion 260 of the front member 244, on a side opposite the bearing 216. In the illustrated embodiment, the backing member 248 includes a plurality of bores 284 aligned with the bores 272 of the front member 244, and the fasteners 268 extend through the bearing 216, the front member 244, and the backing member 248. With reference to FIG. 6, the backing member 248 may be a plate-like structure and have a rectangular perimeter and a central aperture 288 through which the tail shaft 115 extends. However, it should be understood that in other embodiments the backing member 248 may have a different shape.

When the bearing assembly 212 is assembled, the front member 244 is fastened to the bearing 216, the protruding portion 260 extends through the aperture 280 of the support 252, the backing member 248 is fastened to the front member 244, and the support 252 is fixed to the outer box 220.

With reference to FIGS. 5-7D, the aperture 280 within the support 252 is larger in size than the protruding portion 260. In one embodiment, the aperture 280 may be larger than the axially protruding portion 260 by approximately 0.25 inches. Clearance between the axially protruding portion 260 and the support 252 allows for angular misalignment as well as translational movement (e.g., axial and radial misalignment), and rotational misalignment between the axial protrusion 260 and the support 252. Stated another way, the clearance allows the bearing 216 to move or "float" within the outer box 220. FIG. 5 illustrates the tail shaft 115 in a neutral position in which the tail shaft 115 is centrally located and not angularly misaligned. The tail shaft 115 defines a neutral rotational axis A1N while in the neutral position.

Figure 7A:
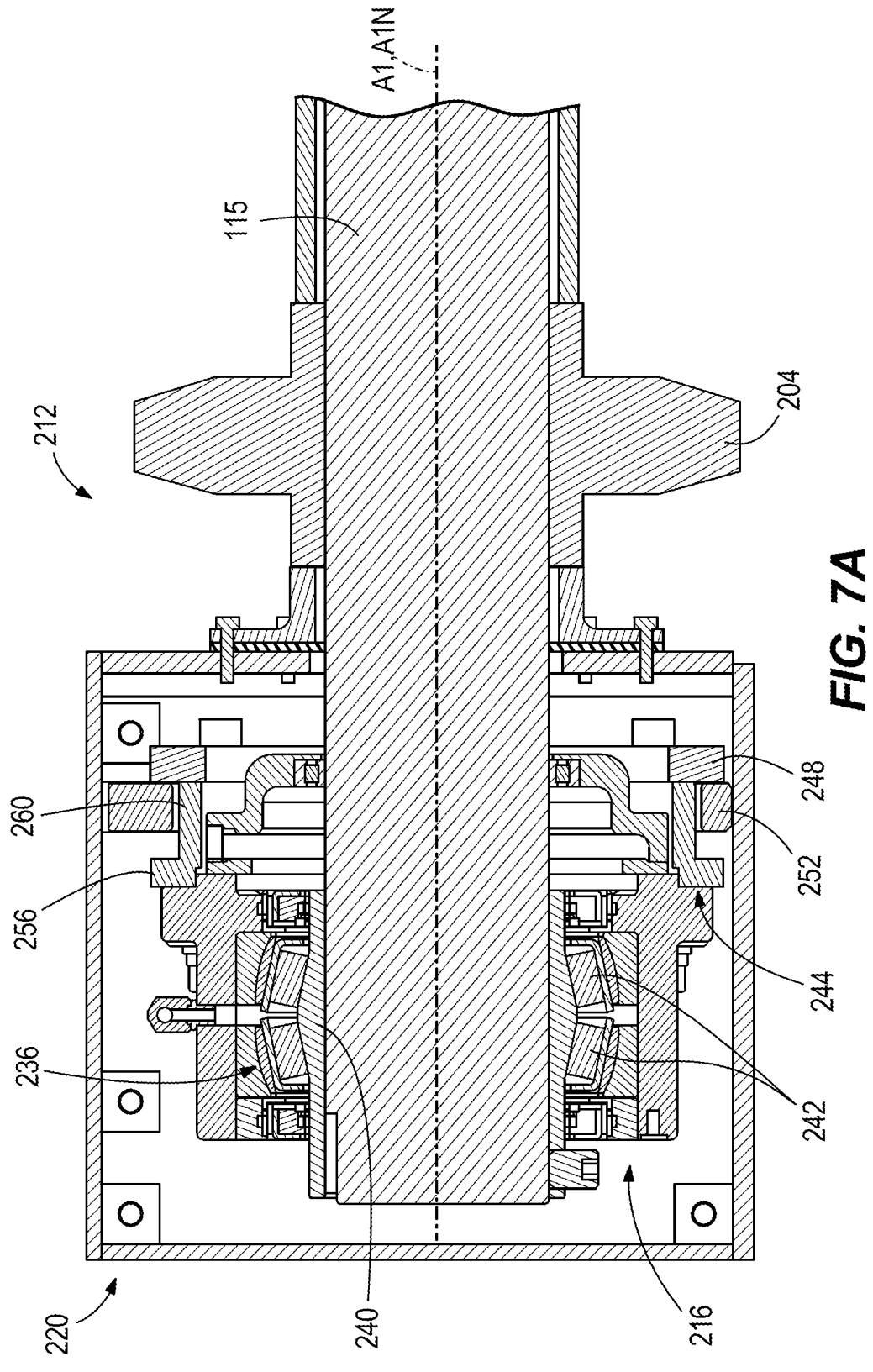
FIG. 7A illustrates the cross-sectional view of the portion of the tail shaft assembly of FIG. 5 in a first axially translated condition.
Figure 7B:
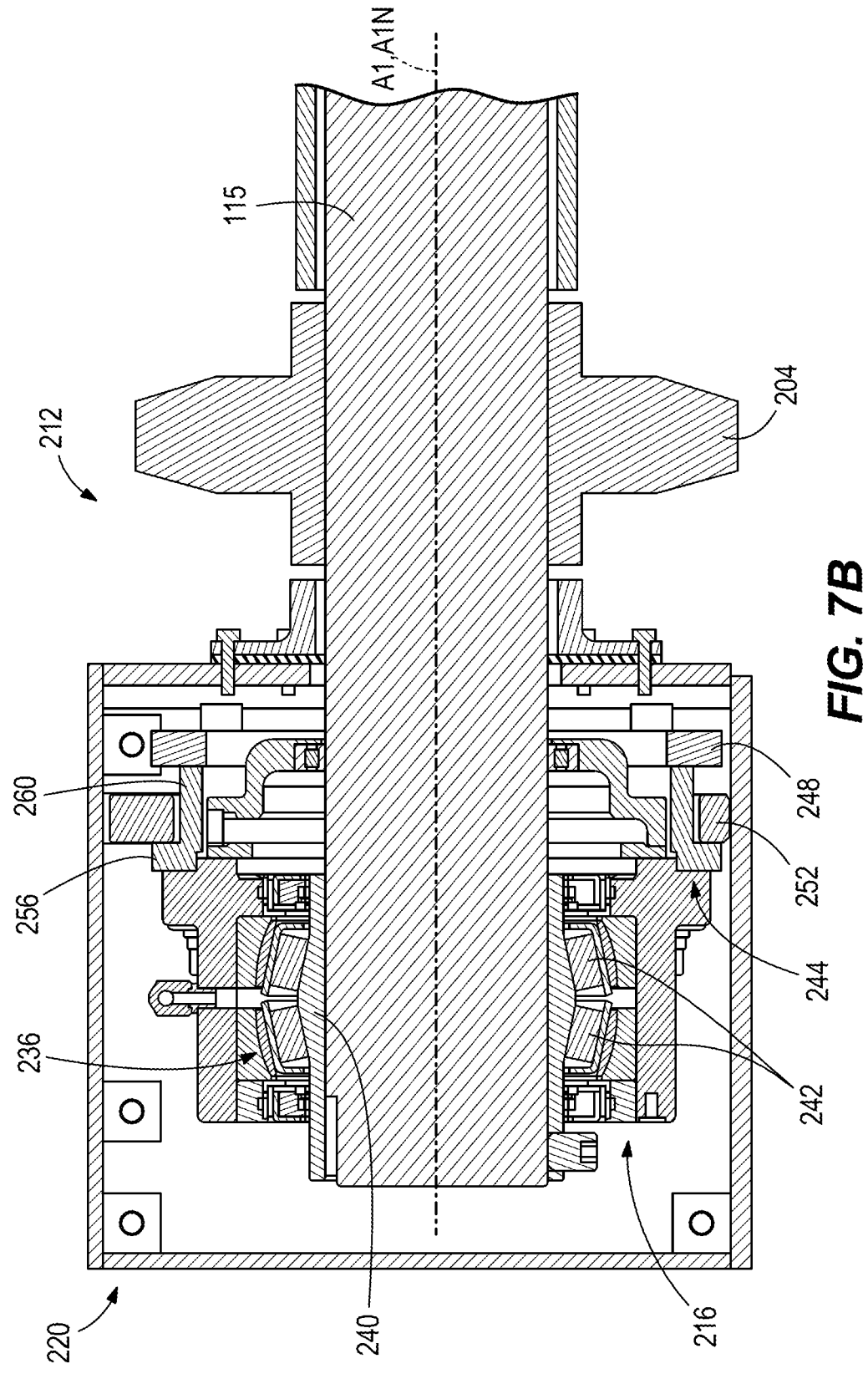
FIG. 7B illustrates the cross-sectional view of the portion of the tail shaft assembly of FIG. 5 in a second axially translated condition.
Figure 7C:
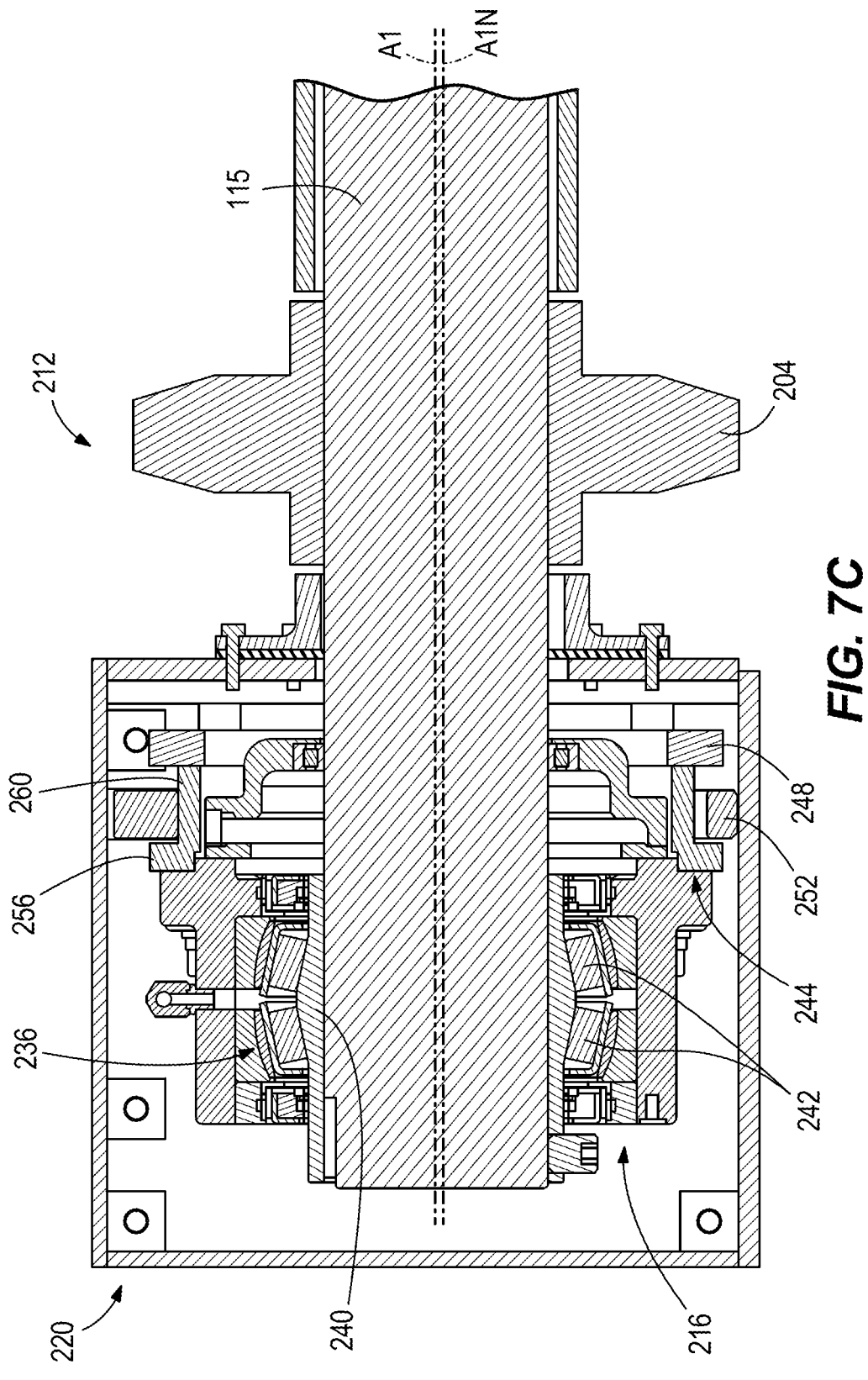
FIG. 7C illustrates the cross-sectional view of the portion of the tail shaft assembly of FIG. 5 in a radially translated position.
Figure 7D:
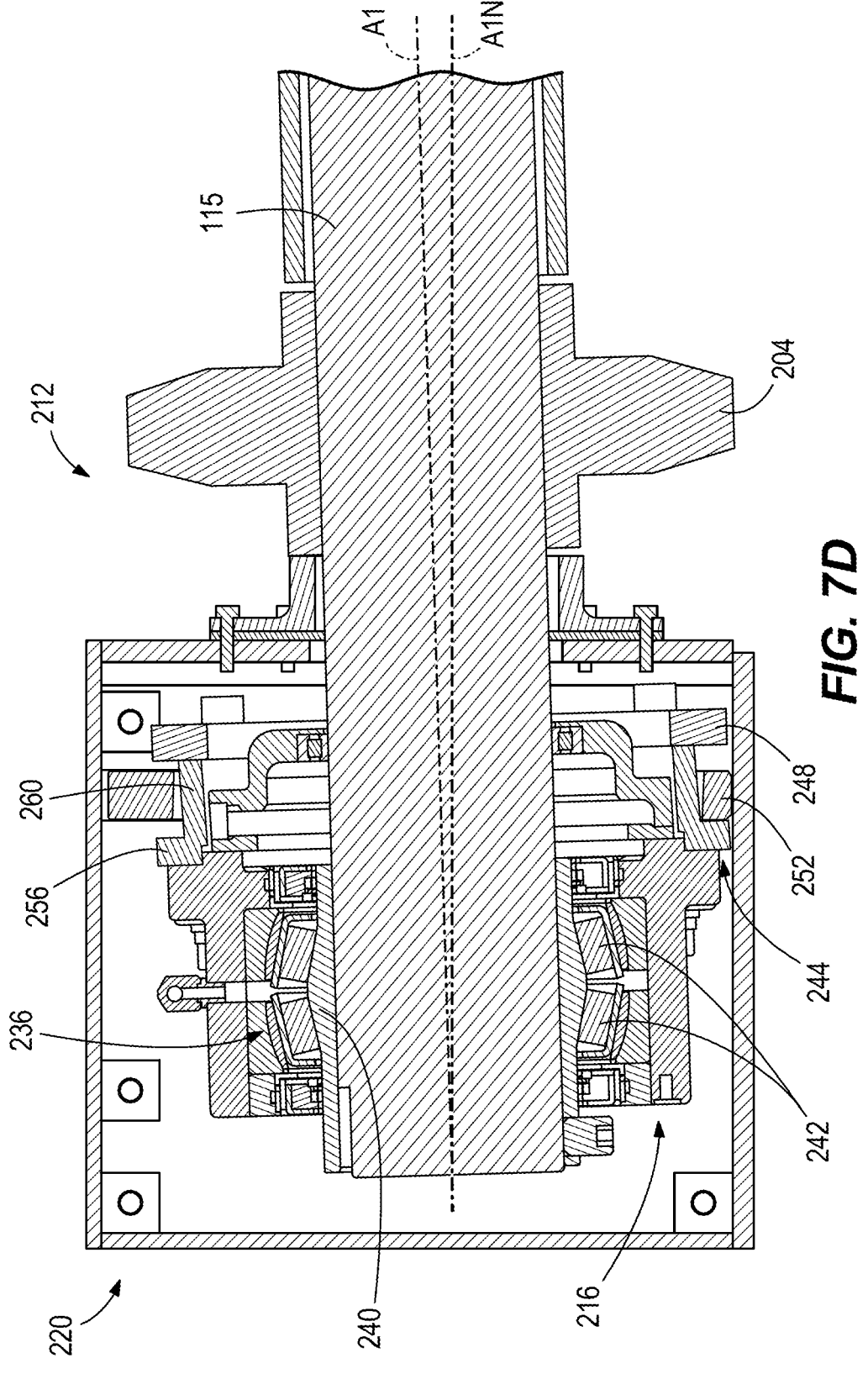
FIG. 7D illustrates the cross-sectional view of the portion of the tail shaft assembly of FIG. 5 in an angularly misaligned condition.

As shown in FIGS. 7A-7D, the tail shaft 115 may also occupy non-neutral positions. Referring to FIGS. 7A and 7B, the backing member 248 and the planar mounting flange portion 256 provide axial stops to limit axial movement of the bearing housing 216 relative to the support 252. In other words, in some embodiments a distance between the backing member 248 and the mounting portion 256 is larger than support 252 so that the bearing housing 216, and thus the tail shaft 115, is capable of limited axial translation in a direction along the rotational axis A1. With reference to FIG. 7C, the clearance between the axially protruding portion 260 and the aperture 280 also allows for translation of the bearing housing 216, and thus the tail shaft 115, relative to the support 252 in a radial direction relative to the neutral rotational axis A1N. The corresponding shapes of the axially protruding portion 260 and the aperture 280 of the support 252 also provide rotationally interlocking surfaces that allow a limited amount of relative rotation between the bearing housing 216 and the outer box 220 while preventing the bearing housing 216 from freely rotating within the outer box 220. In the illustrated embodiment, the bearing housing 216 may rotate up to 10 degrees due to the difference in size between the axially protruding portion 260 and the aperture 280. Finally, with reference to FIG. 7D, the clearance between the axially protruding portion 260 and the support 252 allows for angular misalignment between the bearing housing 216 and the outer box 220. In the illustrated embodiment, this allows the rotational axis A1 of the tail shaft 115 to be misaligned from the neutral rotational axis A1N by up to 5 degrees.

Referring again to FIG. 2, the first bearing assembly 208 and the second bearing assembly 212 each support the tail shaft 115 with the mount 224. The mount 224 in each bearing assembly 208, 212 allows for angular misalignment between the bearing assemblies 208, 212 without increasing stresses on the tail shaft 115 or bearings 216. Allowing for angular misalignment prevents premature wear of the tail shaft 115 and the bearings 216. Similarly, the floating mount 224 assists in maintaining similar tension between the first chain 120 and the second chain 125 and on the first sprocket 200 and the second sprocket 204, thereby inhibiting wear on the sprockets 200, 204 and chains 120, 125.

Although the disclosure has been described in detail with reference to certain preferred embodiments, variations and modifications exist within the scope and spirit of one or more independent aspects of the disclosure as described.

Various features and advantages of the disclosure are set forth in the following claims.

What is claimed is:

1. A bearing assembly for supporting a shaft for rotation, the bearing assembly comprising:
   a housing;
   a bearing positioned in the housing and coupled to the shaft, the bearing configured to support the shaft about an axis; and
   a mount coupled to the bearing and to the housing, the mount movable relative to the housing, thereby allowing multi-axial movement of the bearing relative to the housing.

2. The bearing assembly of claim 1, wherein the mount includes:
   a first member having a mounting portion configured to be coupled to the bearing and a protruding portion extending from the mounting portion,
   a support configured to be coupled to the housing, the support having an aperture through which the protruding portion extends, and
   a second member coupled to the protruding portion.

3. The bearing assembly of claim 2, wherein the first member and the second member are movable relative to the support by a limited distance.

4. The bearing assembly of claim 2, wherein the protruding portion extends along the axis and has a non-circular cross-sectional shape, wherein the aperture has a similar non-circular cross-sectional shape, and wherein the aperture is larger than the protruding portion.

5. The bearing assembly of claim 4, wherein the protruding portion has a rectangular cross-sectional shape.

6. The bearing assembly of claim 4, wherein the protruding portion is movable relative to the support within the aperture.

7. The bearing assembly of claim 2, wherein the protruding portion is axially moveable through the aperture, wherein the support is positioned between the first member and the second member, and wherein the first member and the second member are movable relative to the support within a range equal to a distance between the first member and the second member.

8. The bearing assembly of claim 2, wherein the protruding portion is capable of angular movement within the aperture toward an orientation in which the protruding portion is oriented at an acute angle relative to the support.

9. The bearing assembly of claim 2, wherein the protruding portion is radially moveable within the aperture.

10. A mount configured to support a bearing within a housing, the mount comprising:
    a first member including a mounting portion configured to be coupled to the bearing and a protruding portion extending from the mounting portion;
    a support configured to be secured relative to the housing, the support having an aperture extending therethrough, the protruding portion configured to extend through the aperture; and a second member coupled to an end of the protruding portion, the second member positioned on an opposite side of the support from the mounting portion.

11. The mount of claim 10, wherein the second member has a larger outer perimeter than the aperture of the support, and wherein the mounting portion has a larger outer perimeter than the aperture of the support.

12. The mount of claim 10, wherein a cross-sectional shape of the protruding portion is similar to a cross-sectional shape of the aperture and smaller than the cross-sectional shape of the aperture.

13. The mount of claim 12, wherein the cross-sectional shapes of the protruding portion and the aperture include rotationally interlocking features.

14. The mount of claim 10, wherein the first member and the second member are movable relative to the support.

15. The mount of claim 14, wherein the first member and the second member are movable in translation relative to the support.

16. The mount of claim 14, wherein the first member and the second member are movable such that a rotational axis of a shaft supported by the bearing may be angularly misaligned from a neutral rotational axis of the shaft.

17. An idler assembly for a mining machine, the idler assembly comprising:

an idler shaft including a first end, a second end, and a shaft axis extending therebetween;

a first bearing assembly supporting the first end of the idler shaft for rotation about the shaft axis, the first bearing assembly configured to support the idler shaft relative to a frame; and a second bearing assembly supporting the second end of the idler shaft for rotation about the shaft axis, the second bearing assembly configured to support the idler shaft relative to the frame, wherein at least one of the first bearing assembly and the second bearing assembly includes a housing, a bearing supported by the housing, and a mount configured to allow relative translational movement and rotational movement between the idler shaft and the housing.

18. The idler shaft of claim 17, wherein the idler shaft each of the first bearing assembly and the second bearing assembly are configured to allow for angular misalignment between the idler shaft and the frame.

19. The idler shaft of claim 17, wherein the mount includes, a first member having a mounting portion and a protruding portion, the mounting portion coupled to the bearing, a support coupled to the housing, the support having an aperture through which the protruding portion extends, and a second member coupled to the protruding portion.

20. The idler shaft of claim 19, wherein the support is secured against movement relative to the housing, and wherein the first member and the second member are movable relative to the support.

* * * * *